(12) United States Patent
Lee

(10) Patent No.: US 6,520,473 B2
(45) Date of Patent: Feb. 18, 2003

(54) SUPPORT SYSTEM FOR CONNECTING A COOKING APPARATUS TO A VEHICLE

(76) Inventor: David Lee, 15141 Isleview Dr., Chesterfield, MO (US) 63017

( * ) Notice: Subject to any disclaimer, the term of this patent is extended or adjusted under 35 U.S.C. 154(b) by 0 days.

(21) Appl. No.: 09/832,559

(22) Filed: Apr. 11, 2001

(65) Prior Publication Data

US 2002/0148940 A1 Oct. 17, 2002

(51) Int. Cl.[7] ................................................. A47F 5/00
(52) U.S. Cl. ....................... 248/352; 248/139; 248/133; 248/125.8; 224/402; 224/519; 224/404; 126/126; 126/24; 126/56
(58) Field of Search ............................... 248/352, 125.8, 248/125.9, 126, 122.1, 130, 136, 139, 133, 371, 132, 137, 143, 145; 224/402, 519, 521, 404, 520, 282, 405, 553; 126/56, 24, 25 R, 29, 25 AA, 40, 50, 30, 276, 37 B

(56) References Cited

U.S. PATENT DOCUMENTS

| | | | | |
|---|---|---|---|---|
| 3,032,783 A | * | 5/1962 | Swanson, Jr. ........................ 9/1 |
| 3,235,212 A | * | 2/1966 | Baumiller, Jr. ............... 248/142 |
| 3,759,242 A | | 9/1973 | Mauger ........................ 126/25 |
| D270,689 S | * | 9/1983 | Boscacci ..................... D6/113 |
| 4,518,189 A | * | 5/1985 | Belt ............................. 296/22 |
| 4,729,535 A | | 3/1988 | Frazier et al. ............... 248/230 |
| 4,842,316 A | | 6/1989 | Lerma et al. .................. 296/22 |
| 5,033,448 A | * | 7/1991 | Sandweg ................... 126/25 R |
| 5,263,467 A | * | 11/1993 | Jones ............................ 126/42 |
| 5,287,844 A | | 2/1994 | Fieber .......................... 126/30 |
| 5,310,147 A | * | 5/1994 | Billman ...................... 248/214 |
| 5,327,665 A | * | 7/1994 | Manning et al. ........... 38/102.2 |
| 5,397,147 A | * | 3/1995 | Ducharme et al. ........ 280/415.1 |
| 5,451,088 A | | 9/1995 | Broad .......................... 296/26 |
| 5,518,156 A | | 5/1996 | Lehman ....................... 224/281 |
| 5,626,126 A | * | 5/1997 | Mcnulty ..................... 126/276 |
| 5,640,949 A | * | 6/1997 | Smith .......................... 126/276 |
| 5,950,617 A | | 9/1999 | Lorenz ........................ 126/276 |
| 5,950,890 A | | 9/1999 | Darby .......................... 224/402 |
| 6,070,571 A | * | 6/2000 | Bradbury ...................... 126/30 |
| 6,089,431 A | | 7/2000 | Heyworth .................... 224/521 |
| 6,354,286 B1 | * | 3/2002 | Davis .......................... 126/276 |

* cited by examiner

Primary Examiner—Kimberly Wood
(74) Attorney, Agent, or Firm—John W. Harbst

(57) ABSTRACT

A support system for attaching a cooking apparatus to a vehicle is disclosed. The support system includes a support defining an axis between first and second ends. The first end of the support is configured for attachment to the vehicle. The support system further includes a member connected toward the second end of and extending upwardly from the support. Moreover, the support system includes an apparatus for connecting the cooking apparatus toward a free upper end of the member extending upwardly from the support. Such apparatus includes a mechanism for permitting the cooking apparatus to be pivoted to effect leveling of a cooking surface on the cooking apparatus.

19 Claims, 4 Drawing Sheets

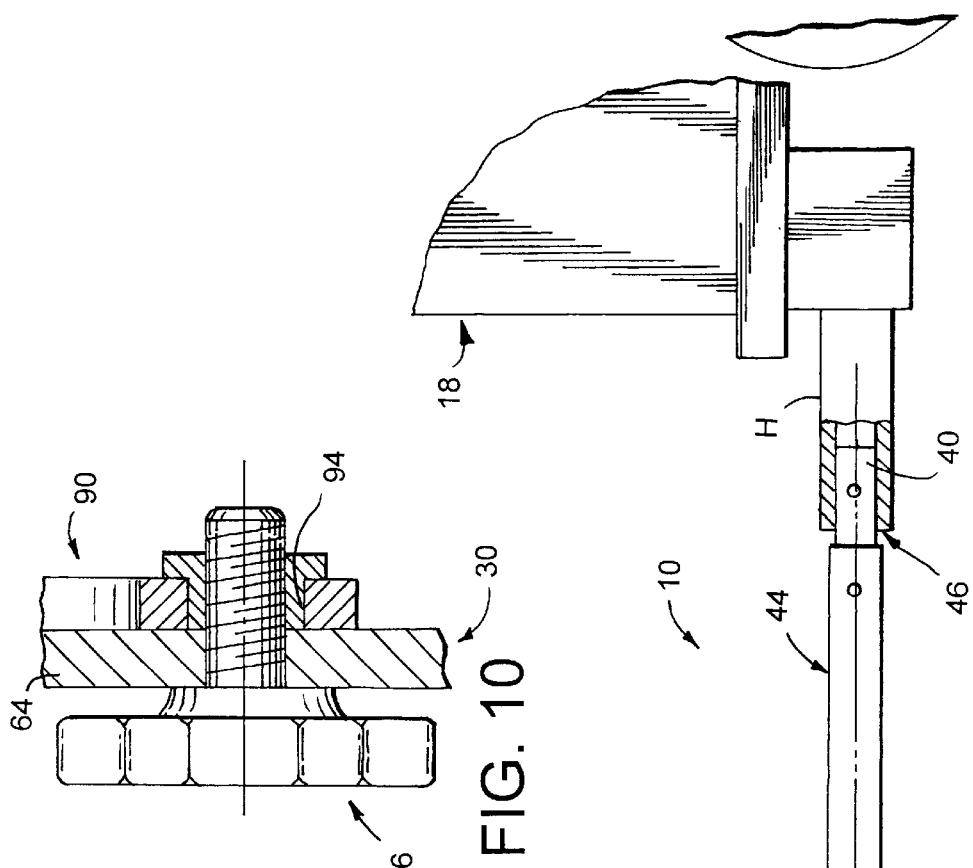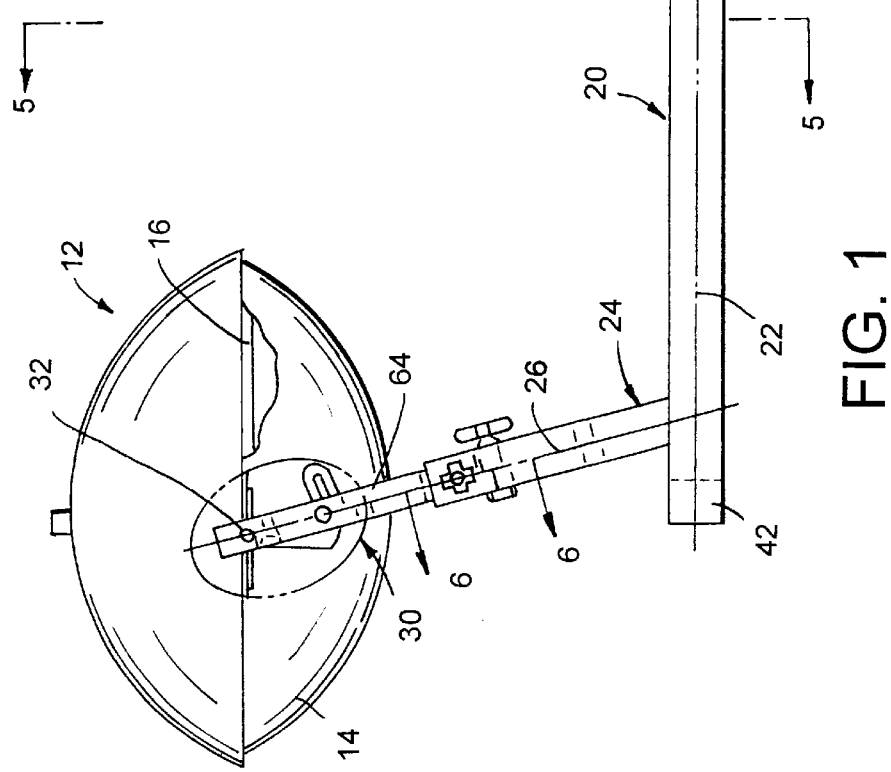

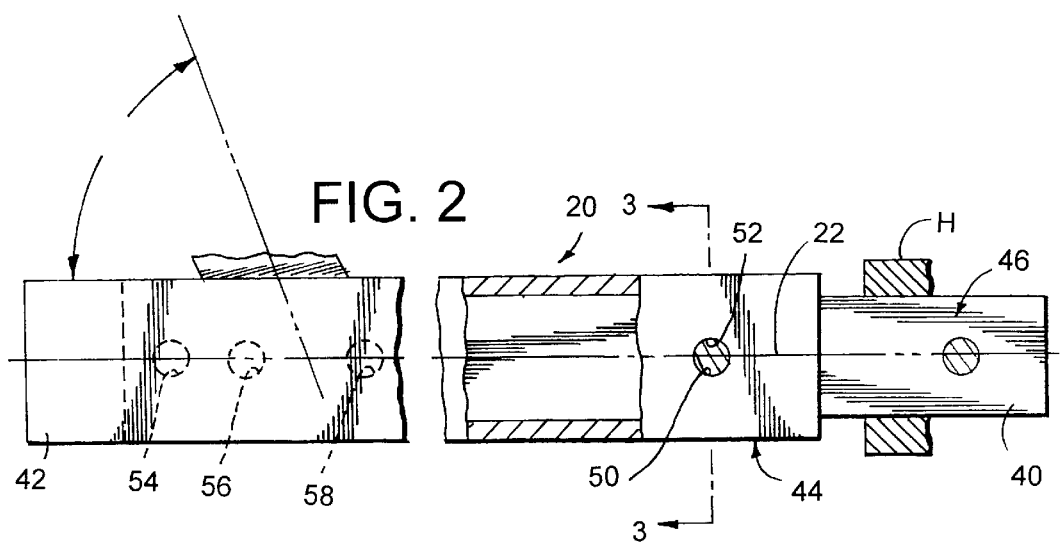
FIG. 2
FIG. 3
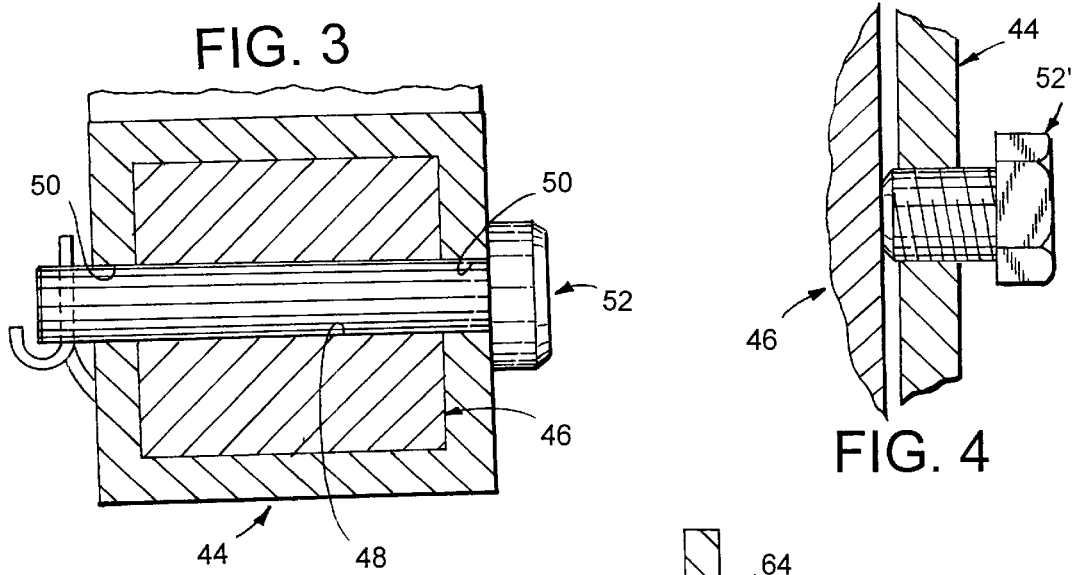
FIG. 4
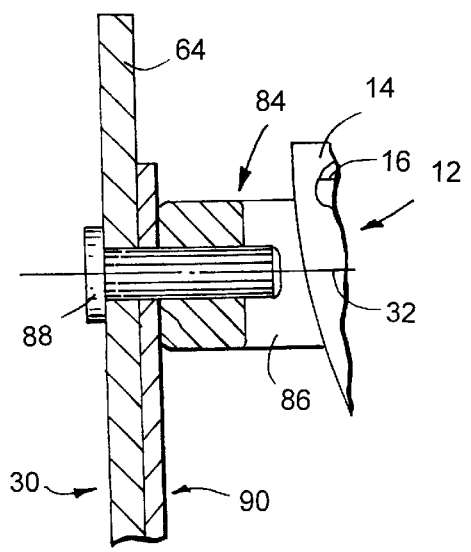
FIG. 9

US 6,520,473 B2

SUPPORT SYSTEM FOR CONNECTING A COOKING APPARATUS TO A VEHICLE

FIELD OF THE INVENTION

The present invention generally relates to a system for supporting an outdoor cooking apparatus, such as a grill or the like, from a vehicle and, more particularly, to a system which allows an outdoor cooking apparatus supported from a vehicle to be leveled thereby enhancing the cooking experience.

BACKGROUND OF THE INVENTION

It is well known to connect a cooking system such as a grill having a cooking surface to a vehicle such as a trailer, motor home, camper, boats and other recreational vehicles. As such, the vehicle with the cooking apparatus can be moved to the desired location where outdoor activities usually take place. As will be appreciated, cooking outside the vehicle significantly reduces the risk of fire or smoke damage inside the vehicle. Additionally, cooking outside the vehicle allows the vehicle to be used for other purposes. Moreover, connecting the cooking apparatus or grill to the outside of the vehicle stabilizes the cooking apparatus and inhibits the grill from inadvertently or carelessly being tipped over or overturned by high winds or the like.

While advantageous, such heretofore known outdoor cooking systems also have certain drawbacks. Many times, such as at "tailgating" parties or the like, the vehicle having the outdoor cooking system attached thereto is parked at a site surrounding a stadium or the like. As such, the cooking surface on the cooking system is generally level. More often, however, at locations such as camping sites, or other remote locations, the terrain on which the vehicle is parked is not level. Accordingly, the open top cooking surface for the cooking system is typically canted resulting in uneven cooking temperatures across the cooking surface, uneven distribution of coals, and a myriad of related problems. As will be appreciated, and when parking the vehicle on uneven terrain, having the cooking apparatus connected to the vehicle as through an elongated support only exacerbates the problem of leveling the cooking surface.

Thus, there is a continuing desire and need for a system which allows an outdoor cooking apparatus to be supported from a vehicle while allowing for a cooking surface on the cooking apparatus to be leveled thereby enhancing the outdoor cooking experience.

SUMMARY OF THE INVENTION

In view of the above, and in accordance with the present invention, there is provided a support system for attaching a cooking apparatus having a base to a vehicle. The support system includes a support defining an axis between first and second ends. The first end of the support is configured for attachment to the vehicle. The support system further includes a member connected toward the second end of and extending upwardly from the support. Moreover, the support system of the present invention includes an apparatus for connecting the base of said cooking apparatus toward a free upper end of the member extending upwardly from the support. Such apparatus includes a mechanism for permitting the base of the cooking apparatus to be pivoted to effect leveling of a cooking surface on the base of the cooking apparatus.

In a preferred embodiment, the support includes first and second parts arranged in telescopic relation relative to each other whereby allowing the cooking apparatus to be positioned at different distances from the vehicle. An inner end of the first part is configured to allow for releasable attachment of the support, and thereby the cooking apparatus or grill, to a receiver hitch on the vehicle. Preferably, the support further includes an attachment mechanism for releasably attaching the first and second parts in a variety of selected linear positions relative to each other to effect the operative length of the support.

In a preferred form, and to facilitate leveling of the cooking surface, the member connected toward an outer end of the support extends upwardly from the support at other than a 90° angle relative to an elongated axis of the support. Preferably, the axis of the member connected to the support and the elongated axis of the support define an included angle ranging between about 20° and about 85° therebetween. In a most preferred embodiment, the member is fixedly connected toward a lower end to the support.

The apparatus for connecting the base of the grill or cooking apparatus to the member extending upwardly from the support preferably includes a pair of upstruck arms which embrace the base of the cooking apparatus therebetween. The upstruck arms of the connecting apparatus are preferably joined to each other and to the member extending upwardly from the support. Preferably, the apparatus for connecting the base of the grill or cooking apparatus and the member extending upwardly from the support are interconnected relative to each other whereby the open top cooking surface on the cooking apparatus base is vertically adjustable relative to the axis of the support extending from the vehicle.

In a most preferred embodiment, the support system allows for pivoting movement of the grill about two separate and distinct axes to effect leveling of the grill cooking surface. More specifically, the support system of the present invention allows for pivotal movement of the grill about a generally horizontal axis extending transverse to an elongated axis of the member extending upwardly from the support. Furthermore, the support system of the present invention permits the grill to be turned or pivotally rotated about the elongated axis of the member extending upwardly from a distal end of the support thereby enhancing leveling capability for the cooking surface on the cooking apparatus.

In a preferred form, the mechanism for permitting the cooking apparatus to be pivotally moved about a generally horizontal axis to effect leveling of the cooking surface includes a pair of brackets fixedly connected to opposed sides of and which rotate or pivot with the cooking apparatus when the cooking surface is to be leveled. The brackets extend generally parallel to and are adjustably connected to the upstruck arms of the connecting apparatus to maintain the cooking surface on the cooking apparatus level with respect to the ground.

A primary object of this invention is to provide a support system which allows an outdoor cooking apparatus to be releasably attached to a vehicle and which is easily and quickly assembled while also being easily and quickly disassembled and stored.

Another object of this invention is to provide a support system which allows an outdoor cooking apparatus to be releasably attached to a vehicle while allowing a cooking surface of the cooking apparatus base to be leveled regardless of the terrain on which the vehicle is parked.

Still another object of the present invention is to provide a support system which allows an outdoor cooking apparatus to be releasably attached to a vehicle and which is economical to manufacture, securely locked in any of several positions, sturdy in construction and which is substantially maintenance free.

These and other aims, objects and advantages of the present invention will become readily apparent from the following detailed description, the drawings, and the appended claims.

DETAILED DESCRIPTION OF THE DRAWINGS

FIG. 1 is side elevational view of the support system of the present invention connected to a vehicle and including a cooking apparatus;

FIG. 2 is an enlarged side elevational view of one form of support forming part of the present invention;

FIG. 3 is an enlarged sectional view taken along line 3—3 of FIG. 2;

FIG. 4 is an enlarged alternative form of apparatus for interconnecting first and second pieces of the support;

FIG. 9 is an enlarged sectional view taken along line 9—9 of FIG. 8; and

FIG. 10 is an enlarged sectional view taken along line 10—10 of FIG. 8;

DESCRIPTION OF THE INVENTION

Figure 5:
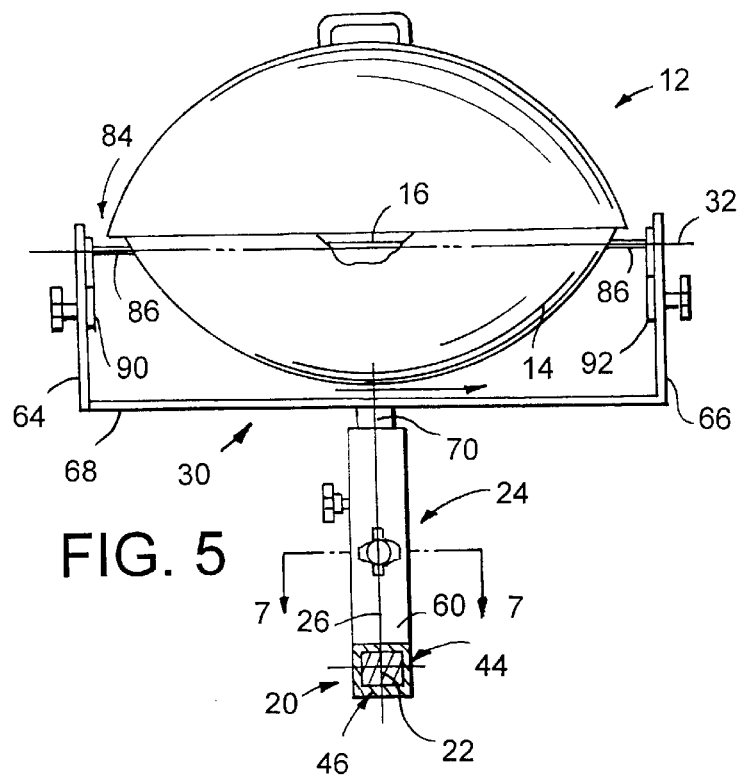
FIG. 5 is a sectional view taken along line 5—5 of FIG. 1.

While the present invention is susceptible of embodiment in various forms, there is shown in the drawings and will hereinafter be described in detail preferred embodiments of the invention with the understanding the present disclosure is intended to set forth exemplifications of the invention which are not intended to limit the invention to the specific embodiments illustrated.

Referring now to the drawings, wherein like reference numerals indicate like parts throughout the several views, there is shown in FIG. 1 a support system, generally identified by reference numeral 10, for connecting a cooking apparatus, such as charcoal or gas grill 12 to a vehicle 18. In the illustrated embodiment, the cooking apparatus 12 includes a base 14 having a cooking surface 16. Although a motor vehicle is shown in FIG. 1, it should be appreciated, the term "vehicle" is intended to include boats, trailers and other forms of recreational vehicles. Of course, the support system 10 of the present system can likewise be readily mounted to other structures such as exterior wails of garages, houses, or other building structures without detracting or departing from the spirit and scope of the present invention.

Broadly stated, the support system 10 of the present invention includes an elongated support 20 having an elongated axis 22, a member 24 connected to and extending upwardly from the support 20, and an apparatus 30 for connecting the cooking apparatus 12 toward an upper end of member 24. As shown in FIG. 1, member 24 defines an elongated axis 26. The apparatus 30 for connecting the cooking apparatus 12 to member 24 defines a generally horizontal axis 32 extending generally transverse or normal to the axis 26 of member 24. As explained in detail below, apparatus 30 is advantageously configured to allow for pivoting As illustrated in FIGS. 1 and 2, the support 20 includes an inner or first end end 40 and an outer or second end 42. The first end 40 of the support 20 is configured for releasable attachment to a receiver hitch H on the vehicle 18. Suffice it to say, support 20 can be releasably connected in any suitable and well known manner to the receiver hitch H. Preferably, support 20 includes first and second parts or elongated pieces 44 and 46, respectively, arranged in telescopic sliding relation relative to each other whereby allowing the operative length of the support 20 to be adjusted. Preferably, the cross-sectional shape of the support pieces 44, 46 are complementary relative to each other and are configured to inhibit turning movement of one piece relative to the other about axis 22. Although a generally square cross-sectional configuration for pieces 44, 46 is illustrated, it will be appreciated that any of numerous other configurations, triangular, rectangular, trapezoidal, etc, would equally suffice. In a most preferred embodiment, the length of each piece 44, 46 of support ranges between about 24 inches to about 48 inches.

The pieces 44, 46 of support 20 are maintained in linearly adjustable position relative to each other using any suitable and well known devices. In the exemplary embodiment shown in FIG. 3, a proximal end of support piece 46 is provided with a throughbore 48. Similarly, and proximate its attachment to the vehicle receiver hitch H, support piece or part 44 is provided with a throughbore 50. An elongated pin or other suitable fastening device 52 passes endwise through the holes, openings, or throughbores 48 and 50 defined by pieces 44 and 46 and serves to releasably attach the support parts 44 and 46 to each other. Returning to FIG. 2, a distal end of support piece or part 44 defines a series of longitudinally spaced holes, openings or apertures 54, 56 and 58 similar in size and shape to hole or opening 50.

An alternative arrangement for releasably securing the parts or pieces 44, 46 of support 20 in adjusted linear positions relative to each other is illustrated in FIG. 4. In this form, a fastener 52' is threadably arranged along the length of part 44. As shown, and in an operative position, an inner end of fastener 52' presses against part 46 whereby releasably holding parts 44, 46 in adjusted linear relation relative to each other. Of course, to change the adjusted linear relation of parts 44, 46 and thereby change the operative length of support 20, the clamping relationship of fastener 52' with inner piece or part 44 is released thereby allowing the parts 44, 46 to be adjusted relative to each other. After the operative length of support 20 is linearly adjusted, the fastener 52' is again tightened to effect a clamping relationship between parts 44 and 46.

As shown, member 24 of the support system 10 is connected toward a distal end of and extends upwardly from the support 20. In the illustrated embodiment, member 24 is fixedly connected to the support 20. As shown in FIGS. 1 and 2, member 24 extends upwardly from the support 20 at an angle other than 90° relative to axis 22 of support 20. As illustrated in FIG. 2, the axis 26 of member 24 defines with the axis 22 of support 20 an included angle β which ranges between about 20° and about 85° therebetween. In a most preferred embodiment, axis 26 of member 24 defines with the axis 22 of support 20 an included angle β of about 75° therebetween.

Figure 6:
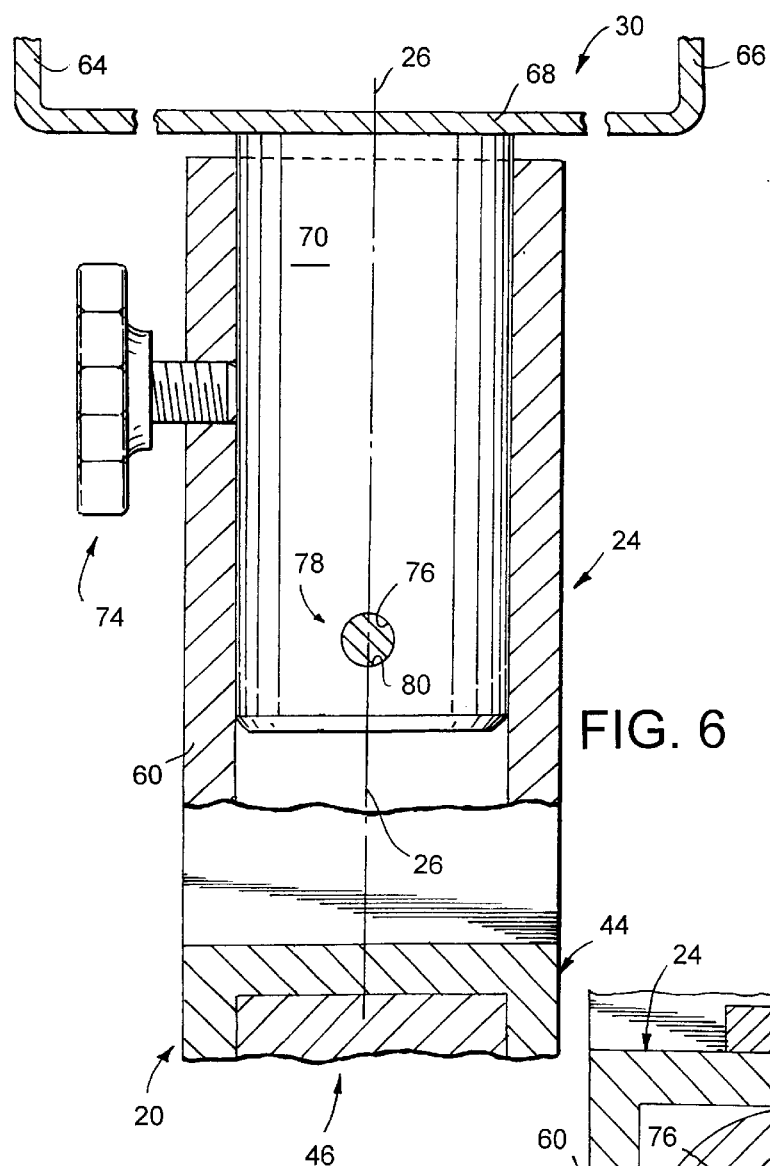
FIG. 6 is an enlarged sectional view taken along line 6—6 of FIG. 1.

In the embodiment shown in FIGS. 5 and 6, member 24 is fabricated from a hollow tube 60 which is open, at least, at the upper end thereof and preferably has a generally square cross-sectional configuration. In a most preferred form, the generally square cross-sectional configuration of tube 60 substantially corresponds to the cross-sectional configuration of the support piece or part 44. Between opposed ends, tube 60 can range in length between about 2 inches to about 15 inches.

As illustrated in FIG. 5, member 24 supports and has connected thereto apparatus 30 to which the cooking apparatus 12 is connected. In the illustrated embodiment, apparatus 30 is connected to the base 14 of the cooking apparatus 12. As shown, apparatus 30 includes a pair of laterally spaced upright vertically rigid arms 64 and 66 which embrace the cooking apparatus base 14 therebetween. The lower ends of arms 64 and 66 of apparatus 30 are joined or connected to each other as with a transverse piece or part 68. It should be appreciated, however, arms 64, 66 and part 68 can either be welded or otherwise fixed relative to each other or formed as a one-piece part without detracting or departing from the invention. Moreover, apparatus 30 furthermore includes a shaft 70 which depends from part 68 and is generally centralized between the arms 64 and 66.

Figure 7:
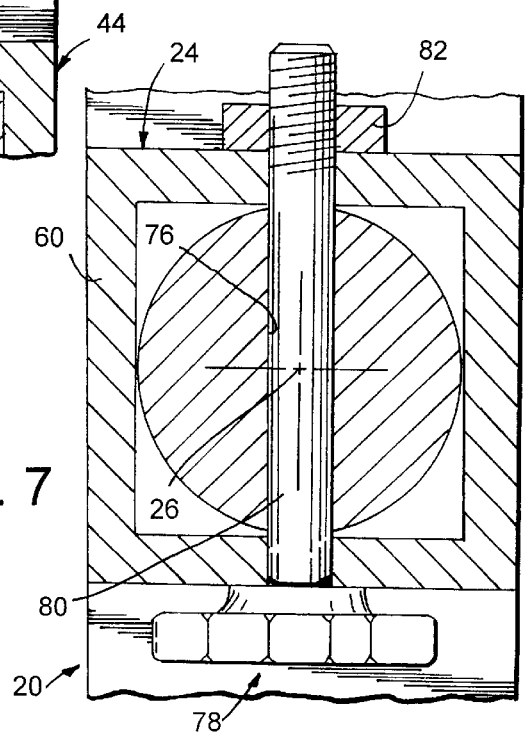
FIG. 7 is an enlarged sectional view taken along line 7—7 of FIG. 5.

As illustrated in FIGS. 6 and 7, the shaft 70 depending from part 68 has a generally cylindrical-like outer configuration and is accommodated for lengthwise or telescopic turning movement within the open top tube 60 of member 24. Notably, after inserting shaft 70 within the open top end of tube 60, the connecting apparatus 30, and, thereby, the base 14 of cooking apparatus or grill 12 (FIG. 5) are all permitted to turn conjointly about axis 26 of member 24.

In a preferred embodiment, the connecting apparatus 30 and the disposition of cooking apparatus 14 are vertically adjustable relative to the support 20 thereby allowing the elevation of cooking surface 16 (FIG. 1) to be adjusted relative to axis 22 of support 20. To effect such ends, the linear disposition of the connecting apparatus shaft 70 relative to tube 60 is adjusted to locate the cooking surface 16 (FIG. 1) at the desired height. After establishing the desired height for the cooking surface 16, a conventional fastener apparatus 74 carried by tube 60 of member 24 is clamped against the shaft 70 thereby releasably maintaining the cooking surface 16 of grill 12 (FIG. 1) at the desired height relative to the axis 22 of support 30.

During transportation of the support assembly 10, the connecting apparatus 30 is preferably maintained against turning movements and in a lowermost position relative to member 24. Accordingly, and as illustrated in FIGS. 6 and 7, along the length thereof, shaft 70 defines a throughbore 76. Moreover, and between opposed ends thereof, member 24 is provided with a conventional fastener 78 which, in the illustrated embodiment, includes an elongated bolt 80 which passes through tube 60 and through the opening or aperture 76 in the shaft 70 and is secured in place by a suitable nut 82. As will be appreciated, the hole or opening 76 in the shaft 70 of apparatus 30 and the fastener 78 are arranged relative to each other such that when the fastener 78 passes through the hole or opening 76 in the shaft 70, the connecting apparatus 30 is located at its lowermost position or location relative to member 24 (FIG. 1). Of course, other suitable fasteners, such as clamp screws or the like similar to fastener 74, for maintaining the connecting apparatus 30 in a lowermost position and against turning relative to member 24 are equally applicable to that shown for exemplary purposes.

Returning to FIG. 5, apparatus 30 further includes a mechanism 84 for permitting the cooking apparatus or grill 12 to be pivoted about the generally horizontal axis 32 to enhance leveling capability for the cooking surface 16. In the exemplary embodiment, mechanism 84 includes a pair of mounting brackets 86 connected to and extending outwardly from diametrically opposed sides of the grill base 14.

Notably, the upstruck arms 64, 66 and the brackets 86 of the connecting apparatus 30 are substantially similar on opposed sides of the grill base 14. Accordingly, only that arrangement for pivotally connecting one side of the grill 12 to the connecting apparatus 30 need be described in detail for a full and complete understanding of the pivotal connection therebetween.

Figure 8:
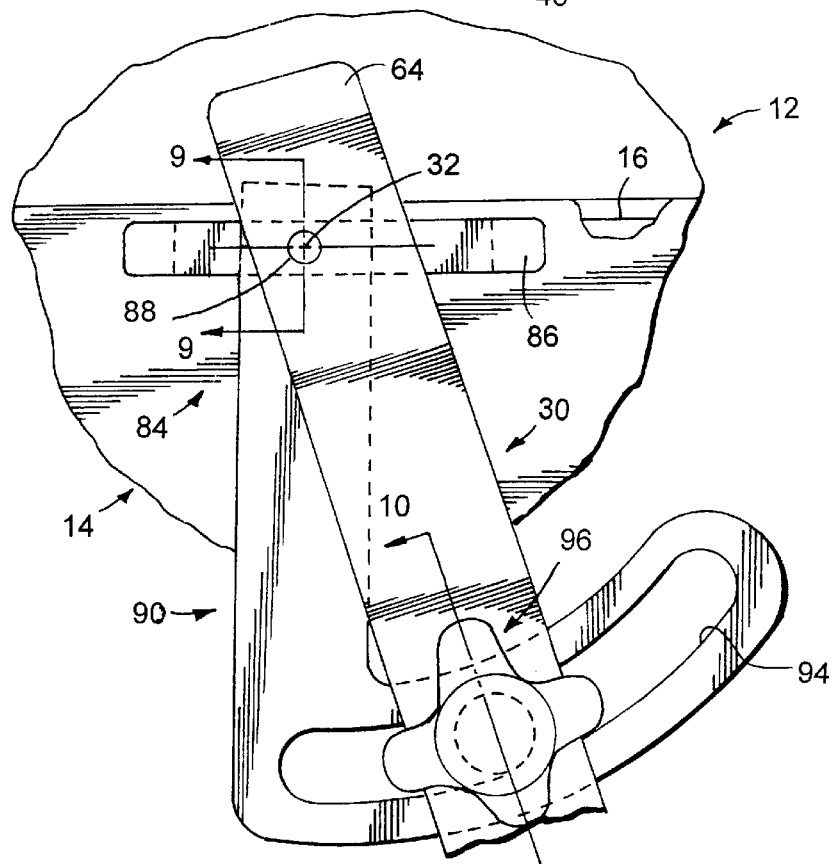
FIG. 8 is an enlarged side elevational view of that area encircled in FIG. 1.

As illustrated in FIGS. 5, 8 and 9, the terminal free end of each upstruck arm 64 of connecting apparatus 30 passes to an outer side of and above the respective bracket 86 of mechanism 84. As shown in FIGS. 8 and 9, a pin 88 passes endwise through the upper end of the upstruck arm 64 of connecting apparatus 30 and is fixed within the respective bracket 86 of mechanism 84. As will be appreciated, the pins 88 passing though the upstruck arms 64, 66 of connecting apparatus 30 are axially aligned relative to each other and define the generally horizontal axis 32 extending generally transverse to member 24 (FIG. 5) and about which the grill 12 pivots to level the grill cooking surface 16.

Preferably, mechanism 84 of connecting apparatus 30 is furthermore structured to maintain the grill cooking surface 16 at an adjusted and generally level disposition after the grill 12 has been pivoted about axis 32. In the embodiment illustrated in FIG. 5, mechanism 84 of connecting apparatus 30 furthermore includes generally L-shaped brackets 90 and 92 disposed in operable combination with the upstruck arms 64 and 66, respectively, of connecting apparatus 30 for maintaining the grill cooking surface 16 at an adjusted and generally level disposition after the grill 12 has been pivoted about axis 32. Because the brackets 90 and 92 on opposed sides of the grill base 14 are substantially similar, the operable association of bracket 90 with arm 64 of connecting apparatus 30 is described in detail and provides a full and complete understanding of one exemplary embodiment for maintaining the grill cooking surface 16 at an adjusted and generally level disposition after the grill 12 has been pivoted about axis 32.

As illustrated in FIGS. 8 and 9, an upper end or leg of bracket 90 is entrapped between the respective upstruck arm 64 of connecting apparatus 30 and the respective mounting bracket 86 of mechanism 84. In the illustrated embodiment, the pin 88 defining axis 32 also passes endwise through the upper end of the respective bracket 90. Notably, however, the upper end of the bracket 90 is affixed or otherwise secured to the bracket 86 of mechanism 84 such that rotation of bracket 90 is effected conjointly with rotation of the cooking grill 12 about axis 32 in a manner effecting leveling of the cooking surface 16 (FIG. 1).

As shown in FIGS. 8 and 10, the lower or other leg of each bracket 90 defines an elongated arcuate slot or opening 94. The radius or arc of slot or opening 94 is defined by the radial distance from the axis 32 about which the bracket 90 and cooking apparatus 12 pivot. A suitable and conventional fastener 96 is provided in operable combination with the slotted portion of bracket 90 and the respective upstruck arm 64 of the connecting apparatus 30. That is, the fastener 96 serves to operably and releasably interconnect or clamp the bracket 90 to the upstruck arm 64 after the cooking apparatus or grill 12 has been pivotally adjusted to level the cooking surface 16 thereby maintaining the cooking surface 16 in a level condition. Of course, providing mechanism 84 with such bracket structure on opposed sides of the cooking apparatus 12 furthermore enhances the ability to maintain the cooking surface 16 at a level disposition until the conventional fastener 96 associated with each bracket 90, 92 is released.

The support system 10 of the present invention enhances use of charcoal or gas grills or other such cooking devices outside of the vehicle while significantly reducing the concern over the terrain on which the vehicle is to be located. In a preferred embodiment, the operative length of the support 20 can be significantly reduced to promote storage of the support system 10 within limited space requirements on the vehicle. Advantageously, and preferably after the first or inner end 40 of the support 20 is releasably affixed to the vehicle hitch H, the operative length of the support 20 is readily and easily adjusted.

In the illustrated embodiment, the operative length of the support 20 is adjusted by releasing the fastener used to releasably hold the parts 44, 46 in their retracted position relative to each other. Thereafter, part 44 is permitted to telescopically extend relative to part 46 until the bore or opening 50 in piece or part 44 aligns with a desired one of the apertures 54, 56 or 58 in piece 46. As will be appreciated, the spaced apertures 54, 56 and 58 in piece or part 46 of support 20 readily allow the overall or operative length of the support 20 to be adjusted whereby allowing the grill or cooking apparatus 12 to be adjustably positioned relative to the vehicle 18 (FIG. 1). Alternatively, the conventional fastener 52' can be operated to effect adjustment of the overall or operative length of the support 20 and thereby the distance the grill 12 is spaced from the vehicle 18.

One of the next steps in setting up the grill or cooking apparatus 12 involves leveling of the cooking surface 16 of the grill 12. Of course, in those locations where the vehicle 18 is parked on terrain which is perfectly level, limited adjustments may be required to effect leveling the cooking surface 16 for the cooking apparatus 12. On the other hand, if the vehicle is parked or located on terrain which is other than perfectly level, the support system 10 of the present invention readily and easily permits the cooking surface 16 for the grill or cooking apparatus 12 to be leveled with minimum steps thereby enhancing the outdoor cooking experience.

The support system 10 of the present invention uniquely allows the cooking surface 16 for the grill or cooking apparatus 12 to be leveled as through the connecting apparatus 30. More specifically, the support system 10 of the present invention allows the fasteners 96 of mechanism 84 which are arranged on opposed lateral sides of the grill 12 to be released so as to allow base 14 of the cooking grill 12 to be rotated about axis 32 thereby effecting leveling of the cooking surface 16 for the grill 12. After the cooking surface 16 of the cooking apparatus 12 is leveled, as through rotation of the cooking base 12 about axis 32, the conventional fasteners 96 of mechanism 84 are again tightened to effect clamping engagement between brackets 90, 92 and arms 64, 66, respectively, of the connecting apparatus 30 thereby maintaining the cooking surface 16 for the grill 12 at a generally level disposition.

It is recognized the terrain on which the vehicle 18 is parked may be such that the cooking surface 16 for the apparatus 12 is somewhat canted or in a non-level condition even after the cooking apparatus 12 has been adjusted about pivot axis 32 defined by the connecting apparatus 30. One of the salient features of the support system 10 relates to the ability to effect leveling of the cooking surface 16 of the grill 12 as through rotation of the cooking apparatus 12 about two separate and distinct axes. That is, the cooking apparatus or grill 12 can be adjusted about axis 32 in the a manner discussed above. If simple adjustment of the grill 12 about axis 32 does not obtain the desired leveling of the cooking surface 16, however, the present invention furthermore allows for rotation of the cooking grill 12 about axis 26 of member 26. In those instances where rotation of the grill 12 about pivot axis 32 is insufficient to effect leveling of the cooking surface 16, release of the conventional fastener 74 on member 26 allows the shaft 70 of the connecting apparatus 30 and, thus, the grill 12 to be rotated about axis 26 to allow the cooking surface 16 to be leveled with respect to the ground. After leveling of the cooking surface 16 as by rotating the grill 12 about axis 26, the conventional fastener 74 is again tightened to releasably secure the connecting apparatus 30 in a desired location and thereby maintaining the cooking surface 16 for the grill 12 level.

Another unique advantage of the support system 10 of the present invention relates to the ability to advantageously position the cooking surface 16 for the grill 12 at adjustable elevations relative to the axis 22 of the support 20 and, thus, relative to the ground. During transport of the support system 10, it is preferable to affix the connecting apparatus 30 for the grill 12 in a lowermost position relative to member 26. In the illustrated form, the conventional fastener 78 combines with member 24 and depending shalt 70 to maintain the connecting apparatus 30 and thereby the cooking apparatus 12 carried thereby in a lowermost position relative to member 24.

After releasing the conventional fastener 78 from operable association with member 24 and shaft 70, however, the connecting apparatus 30, and the grill 12 carried thereby, can be elevationally positioned relative to axis 22 of support 20. After connecting apparatus 30 and the cooking apparatus 12 are elevationally adjusted to position the cooking surface 16 at the desired height relative to axis 22 of the support 20, the conventional fastener 74 is tightened to maintain the connecting apparatus 30 and, thus, the cooking surface 16 and grill 12 at the desired elevational position for enhancing the outdoor cooking experience.

From the foregoing, it will be observed that numerous modifications and variations can be made and effected without departing or detracting from the true spirit and novel concept of the present invention. Moreover, it will be appreciated, the present disclosure is intended to set forth exemplifications of the invention which are not intended to limit the invention to the specific embodiments illustrated. Rather, this disclosure is intended to cover by the appended claims all such modifications and variations as fall within the spirit and scope of the claims.

What is claimed is:

1. A support system for attaching a cooking apparatus to a vehicle, comprising:

support having first and second ends, with the first end of said support being configured for attachment to the vehicle such that said support extends generally horizontally from said vehicle;

a member connected toward the second end of and extending upwardly from said support; and an apparatus supported toward a free end of said member for rotation about a first axis to facilitate leveling of a cooking surface on the cooking apparatus, with said apparatus extending upwardly from and at an angle ranging between about 50° and about 80° relative to said support, said apparatus including a mounting mechanism configured to permit attachment of the cooking apparatus thereto, with said mounting mechanism being adjustable about a second axis extending generally normal to said first axis to further facilitate leveling of the cooking surface on the cooking apparatus.

2. The support system according to claim 1 wherein said support includes first and second parts arranged in telescopic relation relative to each other whereby allowing the cooking apparatus to be positioned at different distances from the vehicle.

3. The support system according to claim 2 wherein said support further includes an attachment mechanism for releasably attaching said first and second parts in a variety of selected linear positions relative to each other to effect the operative length of said support.

4. The support system according to claim 1 wherein said member is fixedly attached to and extends from said support.

5. The support system according to claim 1 wherein said mounting mechanism includes a pair of upstruck arms which are spaced relative to each other to allow the cooking apparatus to be accommodated therebetween, with said upstruck arms of said mounting mechanism being joined to each other and to said member.

6. The support system according to claim 5 wherein the mounting mechanism of said apparatus includes a pair of brackets adapted to be connected to opposed sides of said cooking apparatus, and wherein said brackets extend generally parallel to and are adjustably connected to the upstruck arms of the mounting mechanism of said apparatus to facilitate leveling of the cooking surface on said cooking apparatus.

7. A support system for releasably mounting a grill to a receiver hitch mounted on a rear end of a vehicle, said support system comprising:
   a support defining an elongated axis between inner and outer ends, with the inner end of said support being configured for releasable attachment to the receiver hitch on the vehicle such that said support extends generally horizontally from the vehicle;
   a member arranged toward the outer end of and extending upwardly and away from said support, and wherein an axis of said member and the elongated axis of said support define an included angle ranging between about 20° and about 80° therebetween; and
   a grill mounting apparatus arranged toward a free upper end of said member to permit selective positioning of a cooking surface on said grill in two intersecting planes whereby facilitating leveling of said cooking surface on said grill, with said grill mounting apparatus being configured to permit attachment of said grill thereto for tilting movements in a generally horizontal plane whereby facilitating leveling of the cooking surface on said grill, and with said grill mounting apparatus being further configured to permit movement of the grill mounting apparatus about a generally vertical plane centered on said axis of said member to a selected rotational position relative to the support to further facilitate leveling of the cooking surface on the grill.

8. The support system according to claim 7 wherein said support includes first and second elongated pieces arranged in telescopic relation relative to each other.

9. The support system according to claim 8 wherein said support further includes an attachment mechanism for releasably attaching the first and second pieces of said support in a variety of selected linear positions relative to each other to effect the operative length of said support.

10. The support system according to claim 8 wherein the first piece of said support has a free end selectively attachable to the receiver hitch on said vehicle.

11. The support system according to claim 7 wherein said member is fixedly attached to said support.

12. The support system according to claim 7 wherein said grill mounting apparatus includes a mounting mechanism having a pair of free ended upstruck arms which are laterally spaced relative to each other to allow said grill to be accommodated therebetween, and wherein said mounting mechanism is adjustable about a pivot axis extending generally normal to the axis of said member.

13. The support system according to claim 7 wherein said grill mounting apparatus and said member are adjustably interconnected to each other whereby allowing said grill mounting apparatus to be vertically adjustable relative to said support.

14. A support system for releasably mounting a grill to a receiver hitch mounted on a rear end of a vehicle, said support system comprising:
   a support defining an axis between inner and outer ends, with the inner end of said support being configured for releasable attachment to the receiver hitch on the vehicle such that said support extends generally horizontally from the vehicle;
   a member defining an elongated axis, with said member being arranged toward the outer end of and extending upwardly and away from said support, and wherein the elongated axis of said member and the axis of said support defining an included angle ranging between about 50° and about 80° therebetween; and
   a grill mounting apparatus adjustably securable toward a free upper end of said member, said grill mounting apparatus being both pivotal about and movable along the elongated axis of said member to facilitate leveling of a cooking surface on said grill, with said grill mounting apparatus further including a mounting mechanism which is adjustable about an axis extending generally transverse to said member to further facilitate leveling of a cooking surface on said grill.

15. The support system according to claim 14 wherein said support includes first and second elongated pieces arranged in telescopic relation relative to each other.

16. The support system according to claim 15 wherein said support further includes an attachment mechanism for releasably attaching the first and second pieces of said support in a variety of selected linear positions relative to each other to effect the operative length of said support.

17. The support system according to claim 14 wherein the mounting mechanism of said grill mounting apparatus includes a pair of free ended upstruck arms which are spaced relative to each other to allow said grill to be accommodated therebetween.

18. The support system according to claim 17 wherein the mounting mechanism of said grill mounting apparatus includes a pair of brackets adapted to be fixedly connected to opposed sides of the grill, and wherein said brackets extend generally parallel to and are adjustably connected to the upstruck arms of the mounting mechanism.

19. The support system according to claim 14 wherein said member is fixedly attached to said support.

* * * * *